Dec. 13, 1955  E. A. SPRIGG  2,727,221
TIRE PRESSURE WARNING SYSTEM
Filed Oct. 18, 1954
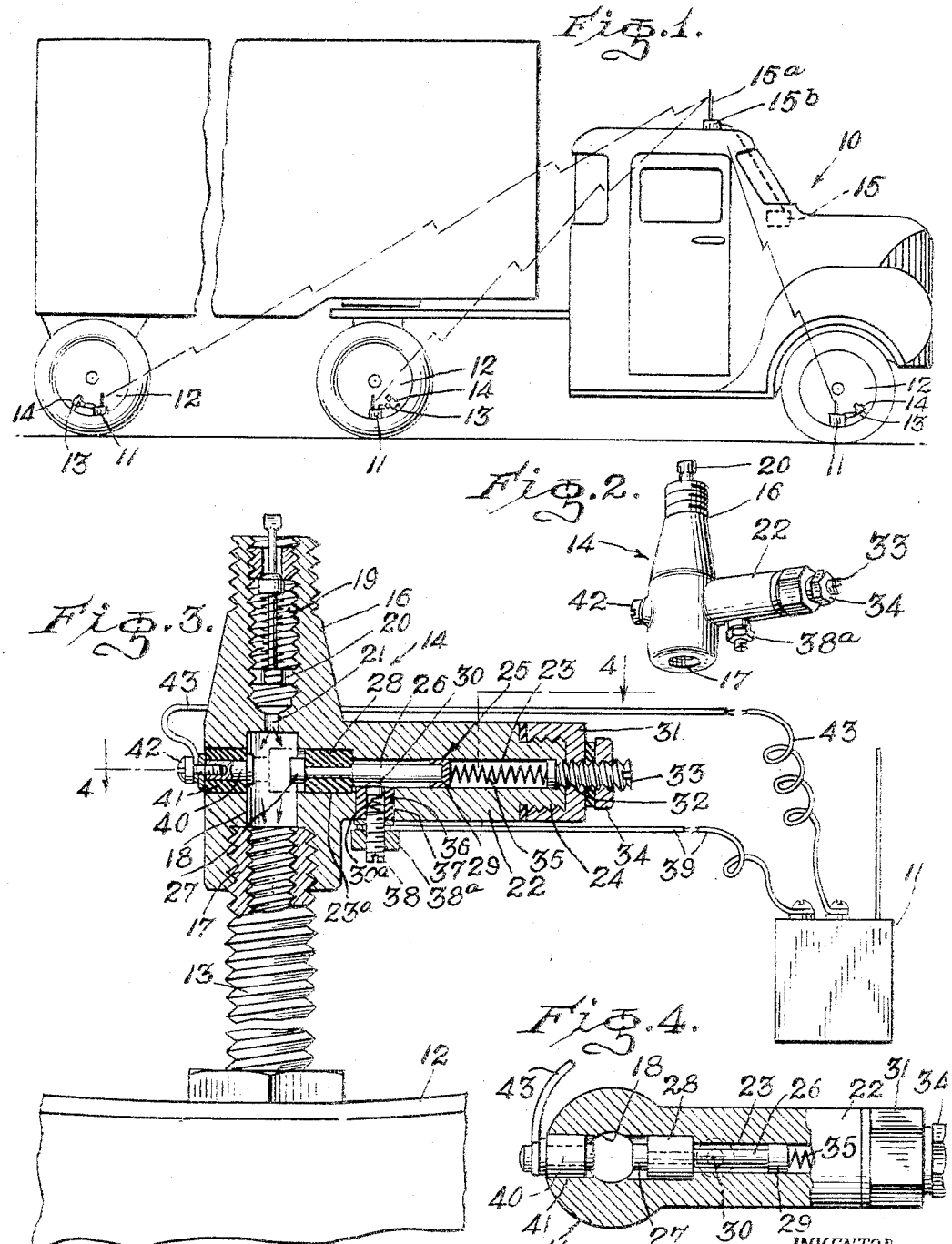
INVENTOR.
Edward A. Sprigg,
BY
ATTORNEY

United States Patent Office 2,727,221
Patented Dec. 13, 1955

2,727,221

TIRE PRESSURE WARNING SYSTEM

Edward A. Sprigg, East Orange, N. J., assignor to Breeze Corporations, Inc., Union, N. J., a corporation of New Jersey Application October 18, 1954, Serial No. 462,730

7 Claims. (Cl. 340—58)

This invention relates to tire pressure warning systems, and more particularly to a tire pressure warning system employing radio signal transmitting and receiving apparatus.

Tire pressure warning systems, while a desirable feature for all vehicles, are of particular importance to large trucks of the type used in interstate commerce, which travel at high speeds with great loads. Under-inflation of one or more tires may result in impairing the stability of the truck, "tractor" or trailer, and increases tire wear. The dangerous unbalance due to improper tire pressure is increased considerably at high speeds.

Presently known tire pressure warning devices use wires to transmit the warning signal from the wheels to the cab. The means whereby the aforesaid circuit is closed under predetermined tire pressure conditions are relatively complicated structures, expensive to fabricate and install. Further disadvantages of present devices are failures and maladjustments resulting from the unavoidable vibration and shocks to which the vehicle is subjected Vibration causes loosening of the electrical connections and breaks in the electrical wires, which transmit the signals to the driving compartment.

Some of these warning devices require extensive modification of the conventional tire rims, hubs and/or brake drum assemblies, in addition to the necessary extensive electrical wiring. These installation requirements increase the cost of present devices considerably above an economical level.

Another disadvantage of present systems is the necessity of uncoupling and reconnecting the electrical leads at each tire change.

Accordingly, it is one of the objects of this invention to provide a tire pressure warning system which utilizes radio frequency signals, thereby eliminating the need for electrical wires from the wheels to the driving compartment for the transmission of the warning signal.

Another object of this invention is to provide a tire pressure warning system which is inexpensive to fabricate and install, and which does not require substantial modification of the vehicle or the vehicle wheels.

A further object of this invention is to produce a tire pressure warning system capable of withstanding the vibration and shock normally encountered in the operation of a vehicle.

A still further object of the present invention is to provide a warning system which eliminates the need for electrical pick-up slip rings, and the like, at the wheels of the vehicle.

A feature of this invention is its use of a small and compact transmitter unit which is affixed to each of the tire rims.

Another feature of the present invention is the use of radio transmitters and receiving apparatus to transmit a warning signal to the driving compartment of the vehicle.

A further feature of this invention is the pressure sensitive switch unit adapted for mounting upon the conventional tire valve stem.

The invention consists of the construction, combination and arrangement of parts, as herein illustrated, described and claimed.

In the accompanying drawings, forming a part hereof, is illustrated one form of embodiment of the invention, in which:

Figure 1 is a schematic showing of a truck equipped with a tire pressure warning system, according to this invention.

Figure 2 is a view in perspective of a pressure responsive switch used in conjunction with the present invention.

Figure 3 is a fragmentary view in section of the pressure responsive switch shown in Figure 2, connected to a radio signal transmitter.

Figure 4 is a sectional view, taken on line 4—4 of Figure 3, looking in the direction indicated by the arrows.

Referring to the drawings, and particularly to Figure 1, 10 indicates a vehicle having radio frequency transmitter units 11 secured to the rims 12 of the vehicle wheels. The transmitters 11 are secured to the rims 12 by means of readily detachable clamps (not shown). Each of the tire valve stems 13 has threaded thereon a pressure responsive switch assembly 14 which is electrically or mechanically connected to the transmitter units 11. The transmitter units 11 are secured to the rims 12 in close proximity to the tire valves 13, so as to require short electrical leads or linkages connecting the two units. The switch assemblies 14 will be hereinafter described at greater length.

Upon the top of the vehicle, at some convenient location, such as the cab roof, is secured a receiving antenna 15a and a receiver unit 15b, adapted to pick up the radio frequency signal transmitted by the transmitter units 11. A warning light panel 15 may be mounted upon the dashboard of the vehicle 10, or may be positioned at any point where it will attract the attention of the operator.

Referring to Figure 2, there is shown one form of a pressure responsive switch assembly 14, which comprises a somewhat T shaped housing 16 with its vertical leg disposed horizontally as an extension 22. The housing 16 is provided with an internally threaded bore 17 adapted to receive the standard thread of the tire valve stem 13. Adjacent the bore 17 is an air pressure chamber 18 which communicates with the threaded bore 17.

In the housing 16 at the opposite end from the bore 17 and above the chamber 18, is provided a cavity 19 adapted to receive a standard tire check valve 20. The cavity 19 communicates with the chamber 18 through a "needle" valve hole 21. The housing extension 22 is provided with a central bore 23 and a threaded end portion 24.

A contact piston assembly 25 is slidably disposed within the bore 23, and comprises a rod 26 which carries at one end thereof an electrical contact 27. Immediately adjacent the contact 27 is mounted an elongated valve member 28 of dielectric material, such as rubber. The bore 23 at the pressure chamber end 18, is enlarged, as indicated at 23a, to receive therein a valve member 28. At the point of maximum travel of the rod 26, the valve member 28 is of such a length as to be still within the enlarged portion 23a of the bore 23.

The opposite end of the rod 20 has thereon an end cap member 29 of slightly smaller diameter than the bore 23. The member 29 and valve 28 are of dielectric material, so as to electrically insulate the rod 26 from a coil spring 25 and the housing 16.

A sealing cap 31 is threaded upon the end 24 of the housing extension 22. The cap 31 is provided with a centrally tapped hole 32 into which is threaded a screw 33.

A lock nut 34 is threaded upon the screw 33 to lock the screw in any selected position.

Between the inner end of the screw 33 and the cap member 29 of the contact assembly 25, is a coil spring 35. By adjustment of the screw 33 within the cap 31, the operating tension of the coil spring 35 may be changed. In electrical contact with the rod 26 is a contact pin 30 slidably carried within an axial bore 36 of a dielectric plug 37. The outer end of the bore 36 is threaded to receive a screw 38. Interposed between the inner end of the screw 38 and the contact pin 30, is a coil spring 30a. The spring 30a maintains the pin 30 in electrical contact with the rod 26 at all times during the travel of the contact assembly 25. Upon the outer end of the screw 38 is threaded a nut 38a, by which an electrical lead 39 may be secured to the screw 38.

The body of the housing 16 opposite the contact 27 is bored to receive a second contact 40 carried within a dielectric plug 41. The contact 40 is threaded to receive a screw 42 by which a lead 43 may be secured to the contact 40.

Before mounting the switch assembly 14 upon the tire valve stem 13, the valve 20 is removed from the valve stem 13 and is threaded into the housing 19 of the switch 14. The tire can now be inflated through the switch housing 14. Leads 39 and 43 may be connected to the transmitter 10 before or after inflation of the tire.

As the valve 28 maintains a seal between the bore 23 and the chamber 18, an increase in pressure within the chamber 18 upon inflation of the tire will force the valve 28 and the rod 26 to the preset pressure position shown in Figure 3.

The tension of the coil spring 35 is adjusted so that upon a predetermined loss in air pressure within the chamber 18, the spring 35 urges the piston contact assembly 25 to the left, as indicated in Figure 3. As the contact assembly 25 moves, it is maintained in electrical contact with the lead 39 through the contact pin 30 and the spring 30a. When the contact 27 engages the contact member 40, the transmitter circuit is closed. The transmitter 11 then emits a radio frequency signal from its antenna 44. The broadcast signal is picked up and amplified by the receiver 15b. The signal is carried by a lead 45 from the receiver unit 15b to the dash board warning unit 15. At the warning unit 15, the signal may be used to illuminate a warning light which may be a neon light, thereby informing the operator of the vehicle of the occurrence and location of tire trouble.

When the tire is again inflated to its proper pressure, the pressure in the chamber 18 will be sufficient to overcome the tension of the spring 34, causing the contact 25 to move to the position shown in Figure 2. When pressure is restored the circuit to the transmitter will be broken at the contact members 27 and 40.

In the event a lower tire pressure is deemed proper, as for example, during summer driving, the switch 14 may be adjusted to allow for this change by merely backing out the screw 33 a few turns to reduce the tension on the coil spring 35. The reduced spring tension permits a lower pressure in the chamber 18 before the spring 35 will force the contact assembly 25 to move to close the circuit through the contact members 27 and 40.

In vehicles having tandem wheels 11, two switch assemblies 14 may be connected in parallel, so that either tire can put the transmitter 10 into operation upon the loss of proper tire pressure.

The transmitters 11 may be selected from any of the presently known high frequency miniature units designed to produce a continuous wave signal of limited range, but of sufficient strength to be detected by the receiver 15b, and amplified. Electrical components are preferably made using the printed circuit technique, and employing transistors in place of thermionic tubes.

The transmitter 10 on each wheel may produce a distinct radio frequency signal, so that the exact location of tire trouble is indicated by the warning light unit 15. In order to separate the several frequencies, the receiving antenna is sufficiently broad in frequency response to be capable of picking up all of the transmitted frequencies. The receiving unit 15b may have frequency isolating circuits so that the proper circuit is energized to indicate the location of the tire trouble.

Each transmitter 11 includes therein a source of electrical potential such as, miniature batteries. The receiver may be operated from the vehicle battery or generator.

The receiving circuit 15b is provided with a manually operated switch (not shown) by which the receiver circuit may be rendered inoperative for repair or inspection purposes.

It is within the purview of the present invention to employ a radio frequency tire warning system requiring only one transmitted nominal frequency by using a phase modulation of the transmitter with a slightly more complicated transmittal circuit and a frequency modulated receiver having phase separating circuits to separately indicate the tire location.

It is also contemplated, and is within the spirit and scope of this invention, to provide a single transmitted frequency using tone modulation of the carrier with different audio tones at each of the wheels. The location of the trouble is then identified by a tone comparison system where identical tones are superimposed on each other through a loud speaker.

Having fully described the invention, it is readily seen that a tire pressure warning system has been provided, which does not require electrical leads connecting each of wires to the warning unit at the dash board of the vehicle. The system eliminates extensive modification of the vehicle required by present devices, and is inexpensive to install. The transmitter pressure sensitive switches and the receiver assembly are of rugged construction, and free from the effects of vibration and shock. The protection against failure due to vibration and shock insures the system of a long operative life.

Having thus fully described the invention, what is claimed as new and sought to be secured by Letters Patent of the United States, is:

1. A tire pressure warning system for vehicles employing gas inflated tires comprising, a radio signal transmitter adapted to send out selected frequencies secured to each wheel of said vehicle, a tire pressure sensitive switch secured to each tire of said vehicle, each of said switches being connected to one of said transmitters to cause the transmitter to emit a radio signal at a predetermined tire pressure, a radio signal receiver carried by the vehicle tuned to the transmitter frequencies and adapted to detect said signals, and warning means in the vehicle responsive to the signal receiving element for indicating to the operator the presence of tire pressure trouble.

2. A tire pressure warning system for vehicles employing gas inflated tires comprising, a high frequency self-contained miniature radio signal transmitter adapted to send out selected frequencies secured to each wheel of said vehicle, a tire pressure sensitive switch secured to each tire of said vehicle, each of said switches being connected to one of said transmitters to cause the transmitter to emit a radio signal at a predetermined tire pressure, a radio signal receiver carried by the vehicle tuned to the transmitter frequencies and adapted to detect said signals, and warning means in the vehicle responsive to the signal receiving element for indicating to the operator the presence of tire pressure trouble.

3. A tire pressure warning system for vehicles employing gas inflated tires comprising, a radio signal transmitter secured to each wheel of said vehicle, each of said radio transmitters being capable of emitting a distinct radio frequency signal, a tire pressure sensitive switch secured to each tire of said vehicle, each of said switches being connected to one of said transmitters to cause the transmitter to emit a radio signal at a predetermined tire pressure, a radio signal receiver carried by the vehicle tuned to the transmitter frequencies and adapted to detect said signals, and warning means in the vehicle responsive to the signal receiving element for indicating to the operator the presence of tire pressure trouble.

4. A tire pressure warning system for vehicles employing gas inflated tires comprising, a radio signal transmitter adapted to send out selected frequencies secured to each wheel of said vehicle, a tire pressure sensitive switch secured to each tire of said vehicle, each of said switches being connected to one of said transmitters to cause the transmitter to emit a radio signal at a predetermined tire pressure, a multi-frequency radio signal receiver carried by the vehicle tuned to the transmitter frequencies and adapted to detect said signals, and warning means in the vehicle responsive to the signal receiving element for indicating to the operator the presence of tire pressure trouble.

5. A tire pressure warning system for vehicles employing gas inflated tires comprising, a radio signal transmitter secured to each wheel of said vehicle, each of said radio transmitters being capable of emitting a distinct radio frequency signal, a tire pressure sensitive switch secured to each tire of said vehicle, each of said switches being connected to one of said transmitters to cause the transmitter to emit a radio signal at a predetermined tire pressure, a multi-frequency radio signal receiver having frequency isolating circuits carried by the vehicle tuned to the transmitter frequencies and adapted to detect said signals, and warning means in the vehicle responsive to the signal receiving element connected to said isolating circuits for indicating to the operator the presence of tire pressure trouble.

6. The system described in claim 2, in which the transmitter is a phase modulation transmitter and the receiver is a frequency modulated receiver having phase separating circuits.

7. The system described in claim 2, in which the transmitter is a single frequency transmitter having tone modulation circuit, each transmitter having a distinct audio tone, and the receiver is a receiver provided with a tone comparison circuit, a loud speaker connected to said circuit and a circuit associated with said speaker to superimpose identical tones to indicate the exact location of tire pressure trouble.

References Cited in the file of this patent

UNITED STATES PATENTS

| 2,439,561 | Cressey | Apr. 13, 1948 |
| 2,629,086 | Ainsworth et al. | Feb. 17, 1953 |

FOREIGN PATENTS

| 860,704 | France | Oct. 7, 1940 |